Patented Mar. 5, 1946

2,395,925

UNITED STATES PATENT OFFICE 2,395,925

COATING COMPOSITIONS AND METHOD OF MANUFACTURE

William T. Walton and John W. Eysenbach, Chicago, Ill., assignors to The Sherwin-Williams Company, Cleveland, Ohio, a corporation of Ohio No Drawing. Application October 3, 1942, Serial No. 460,668

6 Claims. (Cl. 106—222)

This invention relates to the production of new and improved oleoresinous varnishes for use as clear coatings in enamel vehicles, and for any of the other uses to which the prior art oleoresinous varnishes may be put.

The properties which are generally most valuable in oleoresinous varnishes are quick drying, resistance of the dry film to attack by hot and cold water and by alkaline solutions, and film hardness, elasticity, and weatherability. The degree to which these properties may be obtained in a varnish has been primarily dependent upon a careful choice of raw materials, most important of which are the oil and the resin.

For the purpose of explanation, we may classify drying oils and resins as strong or weak. In the following discussion, we designate as a strong drying oil one which confers on a varnish made from it good drying properties and high resistance to water and to alkaline solutions. We designate as a weak drying oil one which yields varnishes which dry slowly and have poor resistance to water and to alkaline solutions. The resins are designated in a similar manner. A strong resin is one which yields fast drying varnishes having good resistance to water and to alkaline solutions, while a weak resin is one which yields varnishes which dry slowly and have poor resistance to water and to alkaline solutions. Obviously, these terms are comparative. Oils must be compared with other oils when used with the same resin in the same varnish formula. Resins must be compared with each other when used with the same oil and in the same varnish formula. The conception of drying oils and resins as strong or weak is not an uncommon one and should be familiar to those skilled in the art of varnish making.

By selecting the strongest oil and the strongest resin from the known usable materials, the desired properties may be obtained to the greatest degree. By selecting either a weaker oil or a weaker resin, the desired properties are lost to some degree. Thus, if a strong oil is used with a weak resin, or vice versa, varnishes of an intermediate quality may be obtained. If both the oil and the resin are weak, the varnish will be slow drying, and the dry film will be soft and have little resistance to water or alkali.

By the process of our invention we are enabled to make a varnish from the poorer drying oils and the weaker resins that is equal in its speed of drying, film hardness, and water and alkali resistance to varnishes formerly obtainable only by using both oils and resins of considerably greater strength.

While it is impractical to discuss here all of the oils and resins used in oleoresinous varnish formulation, a few members of both classes of materials will be discussed so as to make clear the purpose and utility of the invention and the manner in which it may be carried out.

Of the oils used in oleoresinous varnish making, tung China-wood oil has been found to be outstanding in imparting the desired properties to a varnish and has reached a position of paramount importance. This oil is characterized by rapid increase of viscosity on heating and consists largely of the glyceride of elaeostearic acid, which is a triply unsaturated fatty acid having 18 carbon atoms in the chain. The unsaturation consists of three double bonds which occupy conjugated positions in the fatty acid chain. When used with even the weakest resins, tung oil yields varnishes which dry quickly to hard films having excellent water and alkali resistance; when used with strong resins, it yields a varnish that is unsurpassed in respect to the desirable properties mentioned.

The value of tung oil as a varnish oil has led to a world-wide search for similar oils, and this has resulted in the discovery or production of other oils having conjugated systems of double bonds in the fatty acid chains. Among these new oils are oiticica and dehydrated castor, which exhibit to different degrees some of the desirable properties of tung oil. For the production of the valuable properties named above in oleoresinous varnish, tung oil is considered the most valuable, oiticica is generally considered second but considerably inferior to tung oil, and dehydrated castor oil exhibits these properties to an even less degree. By reason of the fact that it generally contains a considerable proportion of glycerides in which the double bonds are not in conjugated relation, dehydrated castor oil might appropriately be considered as belonging in the next class of oils to be mentioned.

A second class of oils used in oleoresinous varnish production includes, as suggested above, those oils consisting principally of triglycerides of unsaturated fatty acids which have double bonds in isolated rather than conjugated relation. In this class are linseed oil, perilla oil, fish oils, soy bean oil, and other vegetable oils. These oils are characterized by a relatively slow increase in viscosity on heating compared to tung oil, the bodying speed being dependent upon the number of double bonds and decreasing with saturation of the molecule. When cooked into varnishes, this group of oils yields varnishes which dry more slowly and to softer films than those made with the group of oils first described, and which have considerably lower resistance to water and to alkali solutions.

As indicated above, the relative properties of varnishes made with different oils will depend not only upon the particular oil but also upon the particular resin used in preparing them. A large number of different resins are used in oleoresinous varnish manufacture, and they vary widely in their properties. For the purpose of illustrating our invention, these resins may be roughly divided into several classes.

The first class of resins to be considered embraces natural resins of either fossil or recent origin. The resins of this class may be further divided into two groups known as dammars and copals. The dammars are resins which are soluble in the ordinary varnish making oils or solvents without previous treatment. The copals, on the other hand, must be "run" or "cracked" before they are soluble. The natural resins differ widely in properties and utility in oleoresinous varnish manufacture. The difference of greatest present interest is that some of these resins, e.g. Congo, are highly acidic, while others, e.g. East India or dammar, are much less so. In previous varnish making procedures, it has been common practice to esterify the acidic resins with a polyhydric alcohol, e.g. glycerine, before using them, and such treatment increases the utility of the acidic resins and greatly improves the water and alkali resistance of the resultant varnish film.

A second class of resins with which it is possible to produce varnishes having remarkable drying speed and yielding films of outstanding resistance to water and alkali are the so-called pure or 100% phenolic resins. These resins are condensation products of phenols and aldehydes or terpenes. While they have measurable acid values, they do not have carboxylic groups and will not be considered acidic resins in this discussion.

A third class of resins of wide usage is the modified phenolic resins. These resins consist of phenol aldehyde condensation products reacted with rosin which is generally esterified with a polyhydric alcohol, for example, glycerin.

Still another important class of resins is the maleic-rosin esters. These resins are formed by first reacting rosin with maleic anhydride by means of the Diels-Alder reaction and subsequently esterifying the reaction product with glycerin or other polyhydric alcohols.

One of the widest used varnish resins is ester gum which is produced by esterifying rosin with glycerin or other polyhydric alcohols.

It will be seen that the base for many of these varnish resins is rosin. Rosin is produced from the gum exuded or secreted by various varieties of pine trees and consists in the main of abietic acid, a highly complex, monocarboxylic organic acid. It is probably the most common of the varnish resins. Due to its highly acidic nature and low melting point, it has always been regarded as desirable to reduce the acidity of rosin by esterification with glycerin or other polyhydric alcohols or by neutralization with basic oxides or hydroxides of calcium, barium, zinc, etc., thus forming metallic soaps. The neutralization with glycerin or other polyhydric alcohols serves the double purpose of increasing the melting point and thus hardening the film of varnish made from the resin and also of increasing the resistance of the film to attack by water and alkaline solutions. The formation of metallic soaps serves the purpose of raising the melting point of the resin, thus hardening varnish films made from the resin, but has little effect on increasing the water and alkali resistance, probably due to the ease with which these soap hydrolyze.

A further point of interest concerning rosin is that abietic acid in an unsaturated compound having a plurality of double bonds which, since they react with maleic anhydride, may be in conjugated position. There is considerable controversy over this point. But under proper treatment with condensing agents, such as boron fluoride, aluminum chloride, sulfuric acid and the like, rosin will polymerize to yield a higher melting, more viscous resin. This polymerization apparently takes place through the double bonds and without involving the carboxyl groups since the acid value is not significantly changed by the treatment. After treatment with metallic compounds to produce soaps or esterification with polyhydric alcohol, this polymerized rosin is used as a varnish resin.

We have described these various classes of oils and resins in order to show the importance of the choice of the oil and resin to be combined in varnish formulation and manufacture. Thus it is possible by combining tung oil, the strongest of the drying oils, with limed rosin, one of the weakest resins, to produce a varnish which dries with great rapidity to a hard, tack-free film which has excellent water resistance and some measure of alkali resistance. On the other hand, a similar varnish produced from linseed oil (a weak drying oil) and limed rosin dries slowly to a soft film which is neither water nor alkali resistant. But if the limed rosin in this latter varnish is replaced with a good grade, modified phenolic resin, the speed of drying of the varnish is greatly increased, and the water and alkali resistance of the film may be equal to or even surpass that of a varnish made from tung oil and limed rosin. Of course, if tung oil is used in combination with the modified phenolic resin then the properties of this varnish, with respect to drying and water and alkali resistance, will greatly surpass those of the varnish made with linseed and the same modified phenolic resin.

By proper choice of oil and resin, a varnish made with a weak oil and a strong resin may approximate very closely the desirable properties of a varnish made from a weak resin and a strong oil. Thus a varnish made with dehydrated castor oil and ester gum may have approximately the same drying strength and water and alkali resistance as a varnish made from linseed oil and a modified phenolic resin, or tung oil and limed rosin.

Some of the strong drying oils may be roughly classed as tung oil, oiticica oil, and dehydrated castor oil in order of decreasing strength. Some of the weaker drying oils listed in the same order are perilla, linseed, fish, and soya bean oils.

Some resins listed in order of decreasing strength are "pure" phenolics, modified phenolics, maleic-rosin ester, ester gum, polymerized rosin limed rosin, and rosin.

We have discovered that, by means of our invention, we can produce a novel varnish from a weak drying oil (e. g. linseed oil) and a weak resin (e. g. rosin) and still obtain excellent drying speed and outstanding resistance to water and alkali. From the foregoing discussion, the advantages of this discovery in extending the utility of such low grade raw materials in the varnish industry should be readily apparent. The advantages are particularly important when, in time of war, the importation of raw materials from sources abroad becomes difficult or impossible, for practically all of the higher grade oils and resins are ordinarily imported, or manufactured in part at least from imported raw materials.

In the past when acidic resins have been used in the manufacture of a varnish, it has been customary to esterify the resins with a polyhydric alcohol or saponify them by reaction with metallic compounds in order to enhance their properties as varnish ingredients. It has also been customary in such cases to cook the esterified or saponified acidic resin with the selected drying oil under conditions which do not drive off any substantial amount of volatile products. In fact, efforts have been directed to preventing volatilization of the batch in order that the yield might be as high as possible.

The walls of the kettles used in ordinary varnish making procedures extend far enough above the level of the batch in the kettle to constitute an excellent reflux condenser on which the violatile products condense and return to the batch. Thus, little distillation from the batch takes place. For example, in preparing a linseed oil and ester gum varnish according to the traditional practice, linseed oil or polymerized linseed oil and rosin or polymerized rosin, which has previously been esterified with glycerine, are put into a varnish kettle and heated to the desired bodying temperature, which may be 570–590° F., and held at this temperature until the desired body has been reached. The kettle is then removed from the fire and left to cool, after which the batch is reduced with solvents. The loss of base on cooking will generally run as low as from 2 to 5% by weight.

We have found that by operating contrary to all past practice as described above, we can use such raw materials as linseed oil and rosin and produce a new varnish comparable in drying speed and water and alkali resistance to the best product heretofore obtainable with a much stronger drying oil or a much stronger resin, or both. In carrying out our invention, we take a highly acidic rosin or polymerized rosin that has not been esterified or saponified, or which has been only partly esterified or saponified, and heat it with a polymerized drying oil to a temperature of, for example, 570 to 590° F., under such conditions that 8 to 30% of the batch by weight is distilled off during the period required for the usual degree of bodying to occur. In order to effect the desired amount of volatilization during the normal cooking period, the ordinary varnish kettle may be used with a blowing coil arranged therein on the bottom of the kettle. When the batch in the kettle has reached the elevated cooking temperature, it may be strongly agitated by passing a stream of inert gas through the contents, thus helping to remove the volatile material from the batch and prevent its reflux back into the kettle. When the desired viscosity has been reached, the kettle is removed from the fire and left to cool. The loss of base on cooking will depend on the rate of blowing and, for successful results, should be from 8 to 25% or more. The residue, after reduction with solvents and addition of siccatives in the customary manner, constitutes an excellent varnish possessing the above-mentioned desirable properties to a far greater extent than can be achieved by treating the same materials by any other known process.

It is obvious that the process could be speeded and the quality of the distillate and product further improved by carrying it out under reduced pressure. Decomposition would be reduced thereby, and the distillate would contain less hydrocarbon. However, the procedure works very well at atmospheric pressure, and under these conditions the distillate as received is valuable for use as a fatty acid in soap making and alkyd resin production and for other uses where free fatty acid is applicable.

Without intending to limit ourselves to a process or product performed or produced in accordance with any particular theory, we offer the following explanation for the success of our new process and the outstanding properties of the product produced thereby. During oil bodying the molecular weight increases to an extent which indicates that mostly double molecules are formed. The iodine value decreases correspondingly, proving that linking is effected at the double bonds. The nature and the number of double bonds present in the oil molecule govern the speed of the bodying process. Conjugated double bonds are more reactive than bonds in the non-conjugated position and give rise to more rapid bodying. Thus tung oil, oiticica oil, and dehydrated castor oil, and octadecadiene and octadecatriene glycerides body much more quickly than other drying oils such as perilla, linseed, soya, or fish oil. However, it is generally conceded that the mechanism of polymerization for the second group is the same as for the first. In the second group the double bonds shift from the isolated to the conjugated position under the influence of heat. Polymerization then takes place in the same way as for oils of the first group. Thus both the linseed oil and tung oil groups form the same type of polymerized aggregates.

But the slower drying oils contain in their make-up certain fatty acids which are saturated and hence incapable of polymerization, or which are unsaturated to such a limited degree that they polymerize very slowly. For example, the polymerization of oils of the linseed group is a slow process, and even in a polymerized oil of high viscosity from this group it is known that there is a considerable percentage of unsaturated fatty acids which have not undergone polymerization. These unpolymerized fatty acids probably remain a part of the glyceride structure.

It is important to remember that on polymerization the fatty acids form dimers which, even though freed from the glyceride nucleus, are not volatile under the conditions obtainable in our process, while the unpolymerized fatty acids and the saturated fatty acids which are not capable of polymerization, once freed from the glyceride nucleus are volatile under the conditions of our process.

Now when a polymerized oil of the linseed type (having an isolated double bond system) is cooked under the conditions of our process with a highly acidic resin such as rosin or polymerized rosin, which is but slightly volatile under the conditions of our process, the resin acid replaces, at least in part, the volatile, saturated or unpolymerized fatty acid on the glyceride molecule, and the volatile fatty acid is freed thereby and distilled off. Evidence that this is the explanation for the mechanism is the nature of the distillate, which apparently consists of free fatty acids, short chain fatty acids, and hydrocarbon and water such as would be attendant upon an atmospheric distillation of fatty acid accompanied by partial decomposition thereof, as well as unsaponifiable volatile matter contained in resin and polymerized rosin.

The foregoing theory is supported by an article entitled "On ester exchange by the heating of fatty acid glycerides with resin acids," by Dr. K. Pistor, Farben Zeitung, 30, 3056, (1925), and by United States Patents 1,952,367 and 2,217,363. These publications all disclose the reaction of fatty acid glycerides with resin acids to produce resin acid esters and free fatty acids. We make use of the same type of reaction, while limiting the progress of the reaction by using a highly polymerized drying oil as a starting material, and are thereby enabled to accomplish a selective distillation of the saturated and other unpolymerized fatty acids, as well as certain deleterious, volatile contaminants and decomposition products. Thus, our new varnish consists of a mixed glyceride of a resin acid and a tung-oil-like, polymerized, fatty acid, which serves to explain its excellent properties.

Depending on the degree of completion of the reaction described, the properties of the product will vary. Within limits which vary for different starting materials, the higher the loss on cooking, the better will be the drying properties and water and alkali resistance of the product.

The following specific examples of the application of our invention are given for purposes of illustration and are not to be construed as limiting the scope of the invention:

Example I

| | |
|---|---|
| Polymerized rosin | lbs 200 |
| Litharge | oz 4 |
| Polymerized linseed oil | lbs 403 |

The polymerized rosin is produced by treating rosin with boron fluoride, aluminum chloride, or like material and has a melting point of approximately 208–217° F. and an acid number of 152–156. The polymerized linseed oil is produced by heating alkali refined linseed oil to a temperature of 575–600° F. and holding at this temperature for such a period that, when the oil cools, the final viscosity is Z–6 at 77° F. on the Gardner-Holdt scale.

The above materials are put into a varnish kettle equipped with a blowing coil, heated to from 570–590° F., and held within that temperature range while being blown vigorously with carbon dioxide, nitrogen, superheated steam, or other inert gas until 22% of the material has been volatilized from the kettle. The kettle is then removed from the fire, the blowing is stopped, and the residue is permitted to cool. When the residue has cooled to the customary temperature (between about 350 and 450° F.), it is thinned or reduced with an equal weight of mineral spirits. Siccatives are added, for example, 7 lbs. of lead naphthenate solution (24% Pb), 1¾ lbs. of manganese naphthenate solution (6% Mn), and 5¾ lbs. of cobalt naphthenate solution (6% Co).

The foregoing composition and procedure produces a varnish which has a viscosity of E–F on the Gardner-Holdt scale and which dries rapidly to a hard, tack-free film having excellent water resistance and some measure of resistance to alkali solutions.

The remarkable improvement in the varnish produced in accordance with the foregoing example is illustrated by comparing it with a bodied linseed oil varnish of the same length and viscosity and containing the same amount of drier, but containing a strong, first grade, modified phenolic resin instead of the weak polymerized rosin of the example. The modified phenolic resin used in the comparison varnish is a glycerol ester of rosin modified with about 15% of the condensation product of bis-phenol and formaldehyde. It has a melting point of about 145–150° C. and an acid number of 12 to 15.

With respect to drying, our new poly-rosin linseed varnish made in accordance with the foregoing example, sets to touch in about 50 minutes, while the modified phenolic resin-linseed varnish sets to touch in about 85 minutes. After four hours drying, our new varnish is only slightly tacky while the comparison varnish is very tacky. After eight hours drying the faster drying of our new varnish is still apparent though it is not entirely tack-free. At the end of twenty-four hours our new varnish is dry and tack-free while the comparison varnish retains a slight tack. These drying tests were carried out under normal conditions, i. e. at a temperature of 75° F. and 50% relative humidity.

When films of our new varnish and the comparison varnish were dried on the outside of test tubes for forty-eight hours and then immersed in 3% NaOH solution at 70° F., the film from our new varnish took the same time to fail as did the film from the comparison varnish, both failing after fifteen minutes immersion.

Films from our new varnish and the comparison varnish were prepared on tin plate and permitted to dry for forty-eight hours. On immersion in hot water, our new varnish failed in ten minutes and required twenty minutes to recover, while films from the comparison varnish failed in five minutes and required sixty minutes to recover. In cold water our new varnish did not become white after a week's immersion while the comparison varnish became white in ninety-six hours.

From the foregoing it is apparent that we are enabled by our new process to use a weak polymerized rosin and produce a varnish that is, in all important respects, equal to or better than a similar varnish made by conventional procedure and using a strong, first grade, modified phenolic resin.

Example II

| | Pounds |
|---|---|
| Polymerized rosin | 200 |
| Bodied dehydrated castor oil | 400 |

The bodied dehydrated castor oil is a so-called completely dehydrated castor oil having a viscosity of Z–2 at 77° F. on the Gardner-Holdt scale. The polymerized rosin is the same as in Example I.

The above materials are put into a varnish kettle equipped with a blowing coil, heated to 570–590° F., and blown strongly with a stream of inert gas until 17% of the material has been volatilized from the kettle. The kettle is removed from the fire and permitted to cool. When the residue in the kettle has reached a temperature of 350–450° F., it is reduced, or thinned, with an equal weight of mineral spirits. Siccatives are added, for example 7 lbs. of lead naphthenate solution (24% Pb) and 5¾ lbs. of cobalt naphthenate (6% Co). The resultant product is an excellent varnish which has a viscosity of G–H on the Gardner-Holdt scale and which dries rapidly to a hard, tack-free film and which has excellent water resistance and some measure of resistance to alkaline solution.

Example III

| | Pounds |
|---|---|
| W. W. rosin | 100 |
| 5% limed rosin | 100 |
| $Z_2$ bodied dehydrated castor oil | 300 |
| $Z_2$ bodied linseed oil | 300 |

In this example some lime treated rosin is used in order to produce a higher viscosity varnish having a lower per cent of non-volatile matter.

The above materials are put into a varnish kettle equipped with a blowing coil, heated to 570-590° F., and blown with a stream of inert gas until 16-19% of the original weight of the material in the kettle has been lost by volatilization. The kettle is removed from the fire, and the residue is left to cool. When it has reached a convenient temperature, say 350°-450° F., it is reduced or thinned with sufficient mineral spirits to yield a varnish that is 45% non-volatile. Siccatives are added, for example 9 lbs. of lead naphthenate solution (24% Pb), 2.2 lbs. of manganese naphthenate solution (6% Mn), and 7.4 lbs. cobalt naphthenate solution (6% Co). The resultant product is an excellent varnish which dries rapidly to a hard, tack-free film and which has excellent water resistance. The viscosity will vary with the cooking time and degree of loss. If approximately 18% is lost by volatilization at 585° F. in a period of 80 minutes, the final viscosity will be about "O" at 77° F. on the Gardner-Holdt scale.

When we compare a varnish made in accordance with Example III with a conventionally processed varnish of the same length, viscosity, and non-volatile and drier content, but which is made from limed rosin and an oil consisting of 80% tung and 20% bodied linseed, we find that our new varnish dries with a speed equal to that of the varnish which contains the tung oil. When films of the two varnishes are dried on glass for forty-eight hours and then immersed in 1% NaOH solution, our new varnish requires about 200 minutes to fail, while the comparison varnish fails in about three-fourths that time. When such films are dried for forty-eight hours and then immersed in hot and cold water, our new varnish and the comparison varnish both fail in about three minutes in hot water, but the comparison varnish turns white in cold water considerably sooner than does our new varnish.

The comparison made under Example I illustrates that the varnish produced by our process is generally superior to a similar varnish made by conventional procedure but containing a much stronger resin. The foregoing comparison under Example III is equally favorable when our new varnish is compared with a similar varnish made by conventional procedure but containing a much stronger drying oil. The two comparisons together are believed to show clearly how our new process makes both weak resins and weak oils available for use in varnishes of a quality which formerly required stronger resins or oils, or both.

Example IV

| | | |
|---|---|---|
| Ester gum (A. V. 6) | lbs | 70 |
| Polymerized rosin (A. V. 160) | lbs | 30 |
| Heat bodied linseed oil (Z-6 viscosity) | lbs | 200 |
| Litharge | oz | ¼ |

In this example the applicability of blends of high acidity and low acidity resins is illustrated. The acid value of the blend is approximately 53.

The ester gum, polymerized rosin, and bodied linseed oil are put into a varnish kettle equipped with a blowing coil and heated to 450° F. The litharge is then added and dissolved in the batch. The temperature is then raised to 580° F. and the batch is blown strongly with inert gas until 13% of the material is distilled from the kettle. The blowing is stopped and the kettle removed from the fire to cool. When the residue in the kettle has reached a convenient temperature, say 350-450° F., it is reduced or thinned with an equal weight of mineral spirits and siccatives are added. The resultant product is an excellent varnish which dries to a hard, tack-free film having excellent water resistance and considerable resistance to alkaline solutions.

The following example illustrates the use of the simplest ingredients, viz. untreated rosin and bodied linseed oil or bodied soy bean oil.

Example V

| | | |
|---|---|---|
| M rosin | lbs | 100 |
| Litharge | oz | 4 |
| Heat polymerized soy bean oil | lbs | 200 |

The rosin and polymerized soya bean oil are put into a varnish kettle, equipped with a blowing coil, and heated to 400° F. The litharge is added with stirring. The contents of the kettle are then heated to 570-585° F. and held within this temperature range while a strong stream of inert gas is passed through the hot liquid in the kettle by means of the blowing coil. In this case, when approximately 28% of the material has been volatilized from the kettle, both the blowing and heating are stopped. When the residue has cooled to a convenient temperature (about 350-450° F.) it is thinned or reduced with an equal weight of mineral spirits. The following siccatives are added:

| | Pounds |
|---|---|
| Lead naphthenate solution (24% Pb) | 2.75 |
| Manganese naphthenate solution (6% Mn) | .69 |
| Cobalt naphthenate solution (6% Co) | 2.30 |

The resultant product is a varnish having a viscosity of approximately D-E at 77° F. on the Gardner-Holdt scale. It dries rapidly to a hard, tack-free film which has good resistance to water and some measure of resistance to aqueous alkaline solutions.

The following example illustrates how a portion of the rosin may be esterified with a polyhydric alcohol, e. g. pentaerythritol, as a part of the varnish making procedure.

Example VI

| | | |
|---|---|---|
| N rosin | lbs | 100 |
| Pentaerythritol | lbs | 7 |
| Litharge | oz | 4 |
| Hydrated lime | oz | 8 |
| Heat polymerized linseed oil | lbs | 296 |
| Raw linseed oil | lbs | 8 |

The rosin and heat polymerized linseed oil are heated to 450° F. in a varnish kettle. At this point the litharge, hydrated lime, and pentaerythritol are added as a slurry in 8 lbs. of raw linseed oil, with stirring. The temperature is raised to 550° F. in about one half hour. It is held for one half hour at 550° F., during which time a light stream of inert gas is blown through the mass by means of a blowing coil. The temperature is now raised to 585° F., and the mass is strongly blown with inert gas at this temperature until approximately 10% has been volatilized from the kettle. Heating and blowing are then stopped, and when the residue has cooled to a convenient temperature (about 350° F.–400° F.) 66 gallons of mineral spirits are added with stirring.

The resultant product is a varnish which has a body of H at 77° F. on the Gardner-Holdt scale and which, after siccatives have been added (about 0.5% Pb, 0.03% Mn, and 0.1% Co as metal based on oil weight), dries rapidly to a hard, tack-free film which has excellent water resistance and some measure of resistance to aqueous alkaline solutions.

Our invention having been described in considerable detail and illustrated with several examples of its application, it will be apparent to those skilled in the art that many resins and oils may be used to advantage in accordance with the principles of our disclosure, and our invention is not to be considered as limited to the specific resins and oils hereinbefore mentioned. Among the resins which may be successfully used to obtain the advantage of our invention are rosin, polymerized rosin, hydrogenated rosin, the condensation product of rosin and maleic anhydride or the like, either without esterification or only partially esterified with a polyhydric alcohol, the reaction product of rosin or polymerized rosin and a phenolformaldehyde condensation product, "run" Congo, etc. Among the oils which may be successfully used are bodied linseed oil, bodied sardine oil, bodied menhaden oil, bodied perilla oil, bodied soy bean oil, bodied dehydrated castor oil, bodied walnut oil, and the like. Obviously, other similar resins and oils may be found to work to advantage.

Having thus described our invention, what we claim as new and desire to secure by Letters Patent is:

1. A method of preparing substances suitable for use as varnish bases that form clear films upon thinning with solvents which comprises reacting a minor proportion of an acidic resin containing free carboxylic acid groups and having an acid value of at least 50, and which is substantially non-volatile at the temperature of reaction, with a major proportion of polymerized unsaturated oil having drying characteristics and containing saturated fatty acids and unpolymerized fatty acid substances which are at least partly in the form of glycerides and are substantially non-volatile at the temperature of polymerization of said oil, effecting said reaction at temperatures approximating 570 degrees F. to 590 degrees F., and strongly blowing said reaction mixture with an inert gas during said reaction to remove said volatile fatty acid substances from said reaction mixture, the quantity of said volatile fatty acid substances removed being from about 8% to about 30% by weight of the total polymerized oil.

2. A method of preparing substances suitable for use as varnish bases that form clear films upon thinning with solvents which comprises reacting a minor proportion of rosin with a major proportion of polymerized unsaturated oil having drying characteristics and containing saturated fatty acids and unpolymerized fatty acid substances which are at least partly in the form of glycerides and are substantially non-volatile at the temperature of polymerization of said oil, effecting said reaction at temperatures approximating 570 degrees F. to 590 degrees F., and strongly blowing said reaction mixture with an inert gas during said reaction to remove said volatile fatty acid substances from said reaction mixture, the quantity of said volatile fatty acid substances removed being from about 8% to about 30% by weight of the total polymerized oil.

3. A method of preparing substances suitable for use as varnish bases that form clear films upon thinning with solvents which comprises reacting a minor proportion of polymerized rosin with a major proportion of polymerized unsaturated oil having drying characteristics and containing saturated fatty acids and unpolymerized fatty acid substances which are at least partly in the form of glycerides and are substantially non-volatile at the temperature of polymerization of said oil, effecting said reaction at temperatures approximating 570 degrees F. to 590 degrees F., and strongly blowing said reaction mixture with an inert gas during said reaction to remove said volatile fatty acid substances from said reaction mixture, the quantity of said volatile fatty acid substances removed being from about 8% to about 30% by weight of the total polymerized oil.

4. An unsaturated resinous polymerized substance capable upon thinning with solvents of forming clear films having good drying characteristics, good water resistance and substantial alkali resistance, being the residue obtained by the process of claim 1.

5. An unsaturated resinous polymerized substance capable upon thinning with solvents of forming clear films having good drying characteristics, good water resistance and substantial alkali resistance, being the residue obtained by the process of claim 2.

6. An unsaturated resinous polymerized substance capable upon thinning with solvents of forming clear films having good drying characteristics, good water resistance and substantial alkali resistance, being the residue obtained by the process of claim 3.

WILLIAM T. WALTON.
JOHN W. EYSENBACH.

Certificate of Correction

Patent No. 2,395,925. March 5, 1946.

WILLIAM T. WALTON ET AL.

It is hereby certified that errors appear in the printed specification of the above numbered patent requiring correction as follows: Page 1, second column, line 4, after "tung" insert *or*; page 2, first column, line 74, for "soap" read *soaps*; and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.*